(12) United States Patent
Bradley et al.

(10) Patent No.: US 10,948,053 B2
(45) Date of Patent: Mar. 16, 2021

(54) VARIABLE SPEED TRANSMISSION WITH AUXILIARY DRIVER AND SYSTEM USING SAME

(71) Applicant: Nuovo Pignone Tecnologie Srl, Florence (IT)

(72) Inventors: Paul John Bradley, Worcestershire (GB); Gianluca Boccadamo, Florence (IT); Giuliano Milani, Florence (IT)

(73) Assignee: NUOVO PIGNONE TECNOLOGIE—S.R.L., Florence (IT)

( * ) Notice: Subject to any disclaimer, the term of this patent is extended or adjusted under 35 U.S.C. 154(b) by 81 days.

(21) Appl. No.: 16/316,349

(22) PCT Filed: Jul. 6, 2017

(86) PCT No.: PCT/EP2017/067039
§ 371 (c)(1),
(2) Date: Jan. 8, 2019

(87) PCT Pub. No.: WO2018/007567
PCT Pub. Date: Jan. 11, 2018

(65) Prior Publication Data
US 2020/0182334 A1    Jun. 11, 2020

(30) Foreign Application Priority Data
Jul. 8, 2016   (IT) .................. 102016000071644

(51) Int. Cl.
*F16H 3/72*   (2006.01)
*F02C 7/36*   (2006.01)
*F16H 57/02*  (2012.01)

(52) U.S. Cl.
CPC .............. *F16H 3/725* (2013.01); *F02C 7/36* (2013.01); *F16H 2057/02039* (2013.01)

(58) Field of Classification Search
CPC ........... F16H 3/725; F16H 2057/02039; F16H 3/724; F02C 7/36; F04D 25/028;
(Continued)

(56) References Cited

U.S. PATENT DOCUMENTS 2,908,189 A   10/1959 Parker et al.
3,500,704 A    3/1970 Muller et al.
(Continued)

FOREIGN PATENT DOCUMENTS

DE         2415859 A1   10/1975
DE   102010014588 A1   12/2010
(Continued)

OTHER PUBLICATIONS

Italian Search Report issued in connection with corresponding Italian patent application No. 201600071644 dated Jul. 8, 2016.
(Continued)

*Primary Examiner* — Justin Holmes
(74) *Attorney, Agent, or Firm* — Baker Hughes Patent Organization

(57) ABSTRACT

The system comprises: a main driver configured for rotating at a substantially constant rotational speed; a rotating load configured to be driven into rotation by the main driver; a controller, for controllably adjusting a load rotational speed; a variable speed transmission, arranged between the main driver and the load and comprised of a speed summing gear arrangement having a first input shaft, a second input shaft and an output shaft; an auxiliary driver, mechanically coupled to the second input shaft of the speed summing gear arrangement. The first input shaft of the speed summing gear arrangement is drivingly coupled to the main driver. The output shaft of the speed summing gear arrangement is drivingly coupled to the rotating load. The speed of the
(Continued)

output shaft is a combination of a speed of the main driver and of a speed of the auxiliary driver.

11 Claims, 8 Drawing Sheets

(58) Field of Classification Search
CPC .. F04D 27/0261; F04D 25/163; F04D 27/004; F05D 2260/40311; F25J 2230/20; F25J 2230/22; F25J 2240/82; F25J 1/0282; F25J 1/0284; F25J 1/0285; F25J 1/0287; F25J 1/0288
See application file for complete search history.

(56) References Cited

U.S. PATENT DOCUMENTS

| | | | | |
|---|---|---|---|---|
| 3,861,484 A | * | 1/1975 | Joslin | B60K 6/445 180/65.235 |
| 8,572,943 B1 | * | 11/2013 | Sheridan | F02K 3/06 60/39.08 |
| 2004/0255590 A1 | * | 12/2004 | Rago | F01D 15/10 60/772 |
| 2006/0263203 A1 | * | 11/2006 | Barker | F02B 39/06 415/122.1 |
| 2010/0326075 A1 | | 12/2010 | Fong et al. | |
| 2010/0329903 A1 | | 12/2010 | Fong et al. | |
| 2012/0035014 A1 | * | 2/2012 | Moeller | F03D 15/10 475/5 |
| 2015/0292349 A1 | | 10/2015 | Mariotti et al. | |
| 2017/0126159 A1 | * | 5/2017 | Spierling | H02K 7/1823 |

FOREIGN PATENT DOCUMENTS

| | | |
|---|---|---|
| JP | S6237832 A | 2/1987 |
| JP | S63147666 A | 6/1988 |
| JP | 2012007500 A | 1/2012 |
| JP | 2012523514 A | 10/2012 |
| JP | 2013199882 A | 10/2013 |
| WO | 98050715 A1 | 11/1998 |
| WO | 2016059115 A1 | 4/2016 |
| WO | 2016091958 A1 | 6/2016 |

OTHER PUBLICATIONS

International Search Report isued in connection with corresponding PCT application No. PCT/EP2017/067039 dated Feb. 19, 2018.

* cited by examiner

VARIABLE SPEED TRANSMISSION WITH AUXILIARY DRIVER AND SYSTEM USING SAME

TECHNICAL FIELD

The subject matter of the present disclosure relates to systems comprising a driven machine and a driver. More specifically, embodiments disclosed herein relate to systems where a constant-speed driver drives into rotation a variable-speed rotary machine, such as a compressor, or a compressor train, for instance.

BACKGROUND ART

In several industrial applications a need exists for driving a rotating load using drivers, which rotate at a constant rotational speed, such as electric motors. In some circumstances the rotating load is a turbomachine, such as a compressor. Large axial or centrifugal compressors are typically used in pipelines to pressurize gas to be transported along the pipeline. Large centrifugal or axial compressors are also used in so-called LNG applications, for the liquefaction of natural gas. Compressors are used in such installations to process refrigerant fluids, which are used in a closed cycle to chill the natural gas.

In some applications the rotational speed of the rotating load is required to change and may be modulated between e.g. about 70% and about 105% of the rated rotational speed. Electric motors can rotate at variable speed by interposing a variable frequency driver between the electrical power distribution grid and the electric motor. Variable frequency drivers are complex, costly and cumbersome components, as they must convert very high power rates required by the electric motor. Typical applications of electric motors for driving large compressors may require powers of 1 to several tens of MW.

A need therefore exists for systems which allow a more convenient way of modulating the rotational speed of a variable-speed load driven by a main driver.

SUMMARY OF THE INVENTION

According to a first aspect, in order to address the above mentioned drawbacks of the prior art, a system is disclosed, comprising a main driver configured for rotating at a substantially constant rotational speed and a rotating load configured to be driven into rotation by the main driver. The system further comprises a controller, for controllably adjusting a load rotational speed, and a variable speed transmission, arranged between the main driver and the load and comprised of a speed summing gear arrangement having a first input shaft, a second input shaft and an output shaft. An auxiliary driver is further provided, which is mechanically coupled to the second input shaft of the speed summing gear arrangement and configured to drive in rotation the second input shaft. The first input shaft of the summing gear arrangement is drivingly coupled to the main driver; and the output shaft of the speed summing gear arrangement is drivingly coupled to the rotating load. The speed of the output shaft is a combination of the speed of the main driver and of the auxiliary driver. Acting upon the auxiliary driver the transmission ratio between the main driver and the load can be changed. In this way the main driver can be rotated at a constant, i.e. fixed rotational speed, while the rotational speed of the load can be modulated by controlling the operation of the auxiliary driver.

If the main driver is an electric motor, a variable frequency driver for the main driver can be dispensed with.

The auxiliary driver can be a turbomachine, e.g. a turboexpander, or a steam or vapor turbine. In some embodiments, the rotating load can be a gas compressor and the turboexpander can be powered by gas processed by the gas compressor.

In yet further embodiments the auxiliary driver can be a turbomachine forming part of a closed thermodynamic cycle, for instance an ORC (Organic Rankine Cycle). In such embodiment, waste heat, for instance from a gas turbine engine or other low temperature heat source, can be usefully exploited to drive the auxiliary driver.

The auxiliary driver can be mechanically coupled to the second input shaft of the speed summing gear arrangement either directly or indirectly, i.e. with the interposition of one or more gears, forming e.g. an ordinary gear train.

The first input shaft can be drivingly coupled to the main driver directly or indirectly, e.g. via a gearbox. Similarly, the output shaft of the speed summing gear arrangement can be mechanically coupled to the load either directly or indirectly, i.e. for instance with the interposition of a gearbox or other additional speed adjustment device.

In some embodiments the load can be a turbomachine, e.g. a compressor, such as a centrifugal compressor, an axial compressor or a mixed axial-radial compressor, or the like. Other possible rotating loads can include reciprocating compressors, wherein the main driver rotates the crankshaft of the reciprocating compressor.

Even though the arrangement disclosed herein is particularly useful and advantageous in systems wherein the main driver is an electric motor, other main drivers can be used instead, such as gas turbines or steam turbines. The system as described herein is suitable in all situations where the main driver is a fixed or constant speed main machine. The system is useful whenever the main driver is configured for rotating at a substantially constant rotational speed, which includes not only those drivers, which are constrained to rotate at a constant speed (such as electric motors devoid of a variable frequency driver or other frequency converting devices), but rather also those which are operated at constant speed, e.g. in order to maximize the efficiency thereof.

In particularly advantageous embodiments, the speed summing gear arrangement comprises an epicyclic gear train. As understood herein in its broadest sense an epicyclic gear train is an arrangement of at least two mutually meshing gears, wherein at least one of said gears is idly supported on a rotating member, which rotates around the rotation axis of the other of said at least two mutually meshing gears.

In the configurations disclosed herein the epicyclic gear train has at least two degrees of freedom and at least three meshing gears, whereof at least one (planet gear) is idly supported on a member (planet carrier) which rotates around a stationary rotation axis of another one of the meshing gears forming the train.

According to a further aspect, disclosed herein is a method for operating a variable-speed rotating load, comprising the following steps:

driving the rotating load with a constant-speed main driver through a speed summing gear arrangement comprised of a first input shaft, a second input shaft and an output shaft, the first input shaft being drivingly coupled to the main driver;

varying the speed of the rotating load by supplying auxiliary power to the second input shaft through an auxiliary driver, and controlling a rotational speed of the load by adjusting the speed of the auxiliary driver.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
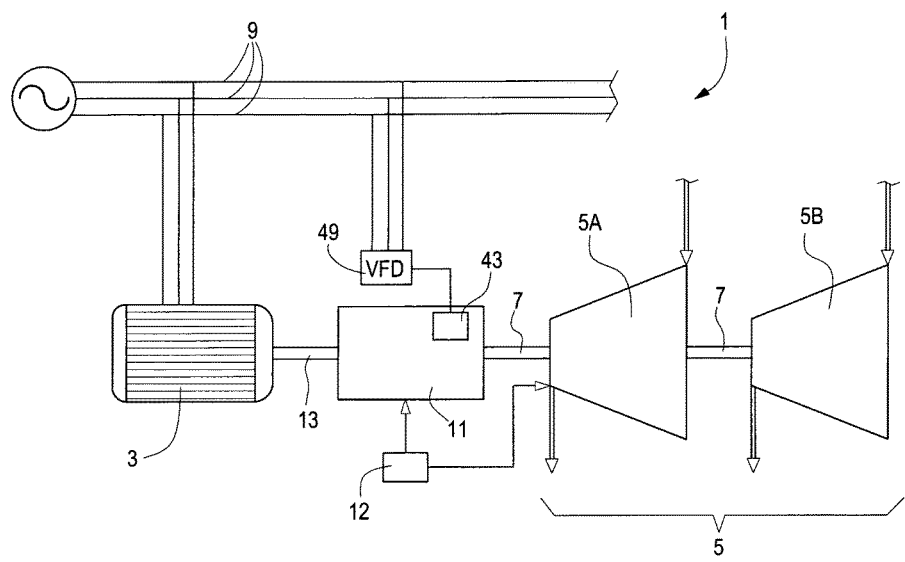
FIG. 1 schematically illustrates a first embodiment of a system according to the present disclosure.

Referring now to FIG. 1, in an embodiment a system 1 is comprised of a main driver 3 and a rotating load 5. In the exemplary embodiment of FIG. 1 the rotating load 5 is comprised of two rotating machines 5A and 5B. One or both the rotating machines 5A, 5B can comprise a compressor, for instance a centrifugal compressor or an axial compressor, or a reciprocating compressor, or a combination thereof. In the following description it will be assumed by way of example that both rotating machines 5A, 5B are compressors. According to the schematic of FIG. 1 the two compressors 5A. 5B are mechanically coupled to a single shaft 7 and rotate therefore at the same speed. In other embodiments, not shown, a gearbox can for instance be arranged between the two compressors 5A, 5B, such that these latter can rotate at different rotational speeds.

In the embodiment of FIG. 1 the main driver 3 can include an electric motor, powered by an electric power distribution grid 9. The main driver 3 may rotate at a fixed, i.e, constant rotational speed, such that a variable frequency driver can be dispensed with.

In order to modify the rotational speed of the load 5, a variable speed transmission 11 is arranged along the shaftline between the main driver 3 and the load 5. The variable speed transmission 11 can be functionally coupled to a controller 12, which is further interfaced with the load 5 or with the process, whereof the load 5 forms part. The controller 12 can be configured to modify the rotational speed of the shaft 7, which drivingly connects an output of the variable speed transmission 11 to the load 5, with respect to the fixed rotational speed of a shaft 13 drivingly connecting the main driver 3 to an input of the variable speed transmission 11.

Figure 2:
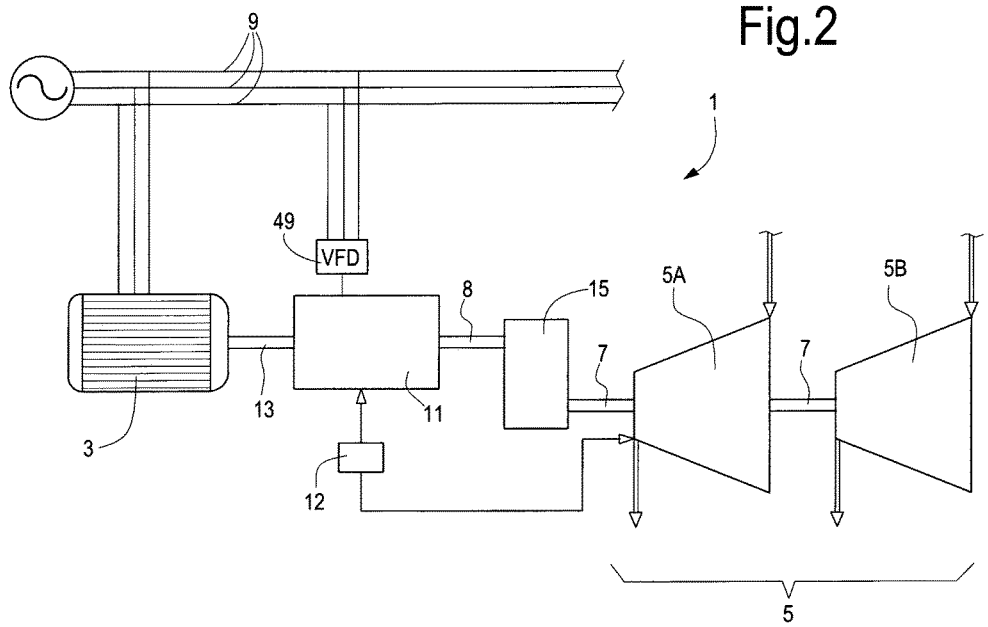
FIG. 2 schematically illustrates a second embodiment of a system according to the present disclosure.

FIG. 2 illustrates a further embodiment of a system according to the present disclosure. The same reference numbers designate the same components, elements or parts shown in FIG. 1 and which will not be described again. The main difference between the system of FIG. 1 and the system of FIG. 2 is a gearbox 15 arranged between the output shaft 8 of the variable speed transmission 11 and the shaft 7, which transmits motion to the load 5. The gearbox 15 can be used e.g. if the required speed ratio between the rotational speed of the output shaft of the main driver 3 and the rotational speed of the load 5 cannot be achieved by the variable speed transmission 11 only.

Figure 3:
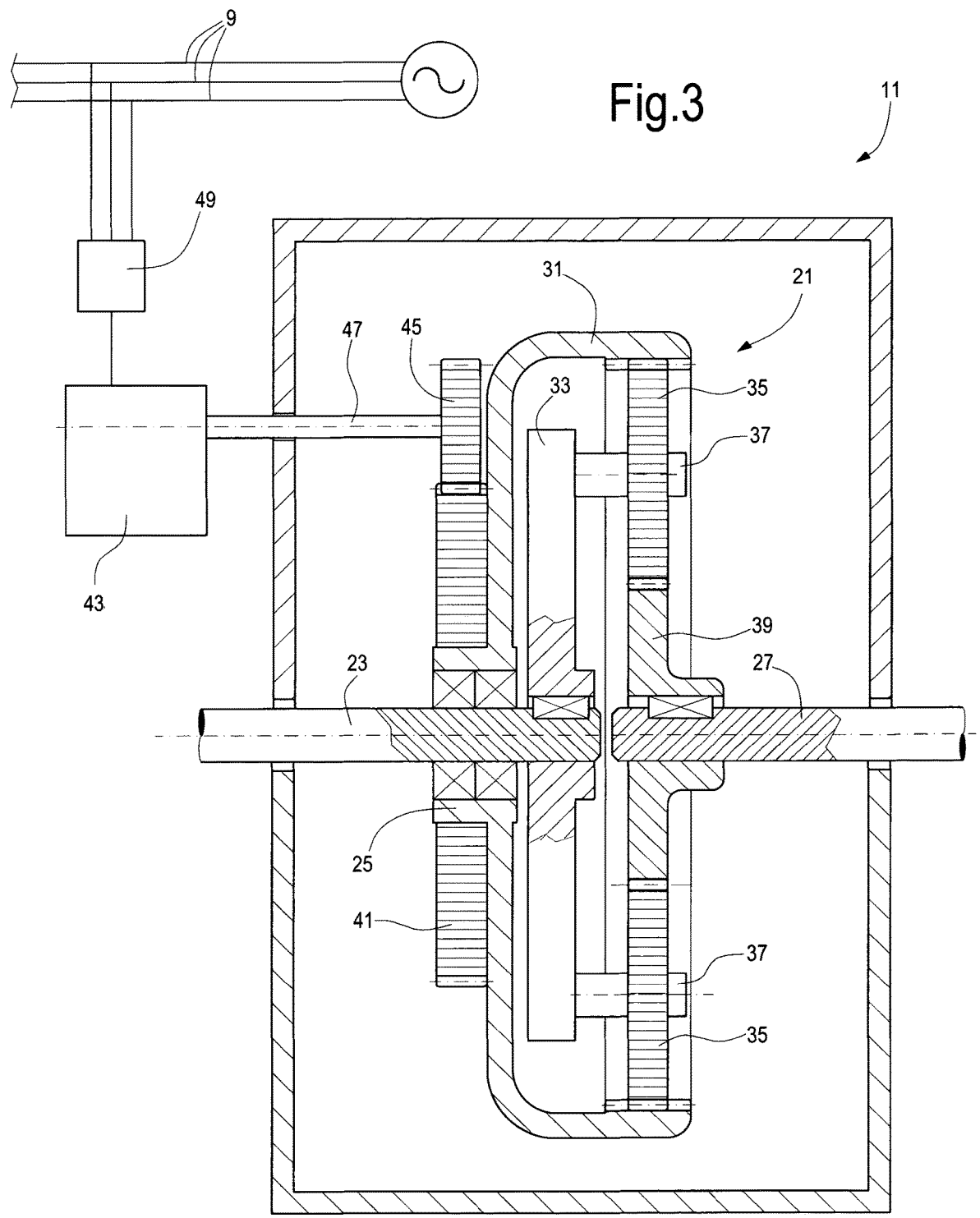
FIGS. 3 and 4 illustrate sectional views of variable speed transmissions of the systems of FIGS. 1 and 2.

Referring now to FIG. 3, with continuing reference to FIGS. 1 and 2, a possible embodiment of the variable speed transmission 11 will be described. The variable speed transmission 11 comprises a speed summing gear arrangement 21 comprised of a first input shaft 23, a second input shaft 25 and an output shaft 27. The output shaft 27 is mechanically coupled to shaft 7 or may form part thereof. The input shaft 23 is mechanically coupled to shaft 13 or may form part thereof.

In the embodiment of FIG. 3 the speed summing gear arrangement 21 is an epicyclic gear train. The epicyclic gear train 21 comprises a ring gear 31 and a planet carrier 33, which supports a plurality of planet gears 35. Each planet gear 35 is idly mounted on a pin 37 constrained to the planet carrier 33 and rotating therewith. The epicyclic gear train 21 further comprises a sun gear 39 keyed on the output shaft 27 and rotating therewith.

In the embodiment of FIG. 3 the ring gear 31 is an internal gear and the planet gears 35 are in mesh with the internal ring gear 31. The planet gears 35 are further in mesh with the sun gear 39. The planet carrier 33 is keyed on the first input shaft 23 and rotates therewith around the axis of the ring gear 31 and of the sun gear 39, such that the ring gear 31, the sun gear 39 and the planet carrier 33 are coaxial.

The ring gear 31 rotates integrally with a gear 41, which receives motion from an auxiliary driver 43. In the embodiment of FIG. 3 the auxiliary driver 43 is mechanically coupled to gear 41 via a pinion 45 that is keyed on a driving shaft 47 of the auxiliary driver 43. Thus the epicyclic gear train 21 has two degrees of freedom and receives input power from the main driver 3 and the auxiliary driver 43.

In the embodiment of FIG. 3 the auxiliary driver 43 is an electric motor. The electric motor 43 is powered by the electric power distribution grid 9. In order for the electric motor 43 to rotate at a variable speed, a variable frequency driver (VFD) 49 is arranged between the electric power distribution grid 9 and the electric motor 43.

As known, the speed ratio $\tau_0$ between the first gear and the last gear of an epicyclic gear train is given by Willis formula.

$$\tau_0 = \frac{\Omega_n - \Omega_p}{\Omega_1 - \Omega_p}$$

wherein:
$\Omega_n$ is the rotational speed of the last gear of the epicyclic gear train
$\Omega_p$ is the rotational speed of the planet carrier
$\Omega_1$ is the rotational speed of the first gear of the epicyclic gear train As shown by the Willis formula, the transmission ratio between the first input shaft 23 and the output shaft 27 can be adjusted by modulating the rotational speed of the ring gear 31. The rotational speed of the ring gear 31 can be controlled by controlling the rotational speed of the auxiliary driver, i.e. the electric motor 43, which is achieved by the variable frequency driver 49.

The range of speed variation around a rated speed of the load 5 is usually small. The epicyclic gear train 21 can be designed such as to provide a speed transmission ratio which is suitable to drive the load 5 at a given pre-set rotational speed, which can e.g. be the maximum speed (for instance 105% of the rated speed of the load 5). If a different speed is required, e.g. if the load shall be driven at 100% or less than 100% of the rated speed thereof, the auxiliary driver 43 is put in motion, to rotate the ring gear 31 at a speed such that, based on the Willis formula, output shaft 27 rotates at the required rotational speed of the load 5. The auxiliary drive 43 can be controlled to rotate in both directions (clockwise and counter-clockwise) and moreover electric energy can be recovered through the auxiliary driver 43 when the latter brakes the ring gear 31.

Since the range of variation of the rotational speed of the load 5 is relatively small, the rotational speed of the ring gear 31 and thus the total power required from the auxiliary driver 43 is small if compared with the driving power provided by the main driver 3. For instance, the arrangement can be set so that the power required from the auxiliary driver 43 is about 15% of the total input power when the load 5 runs at around 105% of the rated speed.

The variable frequency driver 49 required to rotate the auxiliary driver 47 at the desired rotational speed can thus have a substantially low rated power, if compared to a variable frequency driver which is required when the rotational speed modulation is controlled by changing the speed of the main driver 3. The variable frequency driver 49 is thus substantially smaller and more economical than a variable frequency driver suitable for driving the main driver 3 at a variable speed. Additionally, since the efficiency of the variable frequency driver is lower than 100%, a variable frequency driver 49 which processes just a fraction of the total power required to drive the load 5 also reduces the total electric power conversion losses with respect to a current art arrangement, where the whole of the electrical power is converted by a variable frequency driver coupled to the main driver 3.

The speed summing gear arrangement 21 of FIG. 2 is configured such that the sun gear is keyed on the output shaft 27, i.e. the output of the speed summing gear arrangement is the sun gear, while the first input shaft is shaft 23, drivingly coupled to the planet carrier 33 and the second input shaft is shaft 25, drivingly coupled to the ring gear 31. This is not the only possible configuration for the speed summing gear arrangement. As known to those skilled in the art, epicyclic gear trains can be configured in several different ways and the various rotating members thereof can be used in different ways as input or output members.

Figure 4:
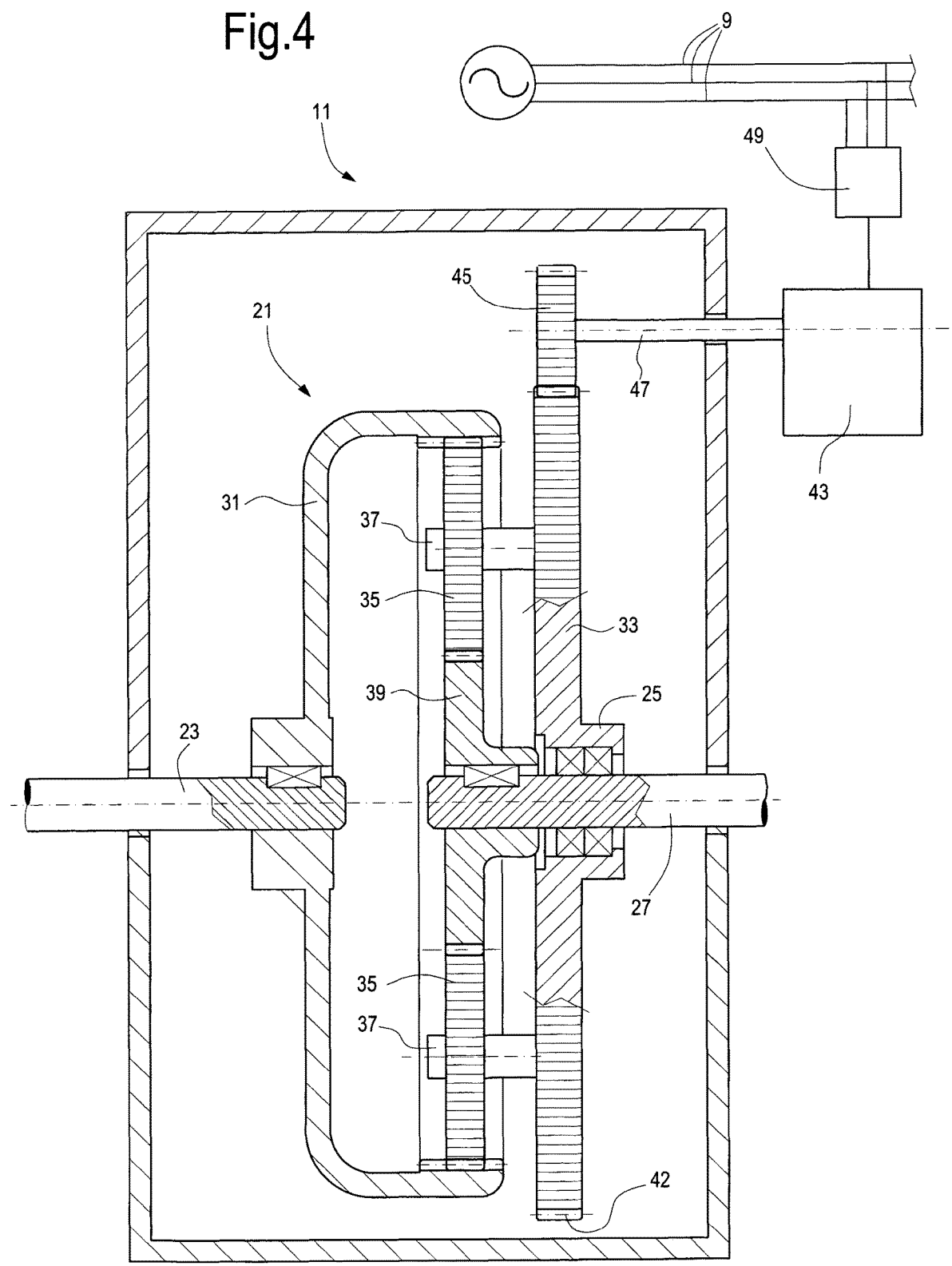

FIG. 4 illustrates a further embodiment of the variable speed transmission 11, using a different speed summing gear arrangement 21. The same reference numbers designate the same or equivalent components as shown in FIG. 3.

The speed summing gear arrangement 21 is again an epicyclic gear train and is comprised of a first input shaft 23, a second input shaft 25 and an output shaft 27. The output shaft 27 is mechanically coupled to shaft 7 or may form part thereof. The input shaft 23 is mechanically coupled to shaft 13 or may form part thereof.

The epicyclic gear train 21 of FIG. 4 again comprises a ring gear 31 and a planet carrier 33, which supports a plurality of planet gears 35. Each planet gear 35 is idly mounted on a respective pin 37 constrained to the planet carrier 33 and rotating therewith. The epicyclic gear train 21 further comprises a sun gear 39 keyed on the output shaft 27 and rotating therewith. In the embodiment of FIG. 4 the ring gear 31 is again an internal gear and the planet gears 35 are in mesh with the internal ring gear 31. The planet gears 35 are further in mesh with the sun gear 39. Differently from the embodiment of FIG. 3, in FIG. 4 the ring gear 31 is keyed on the first input shaft 23 and rotates therewith.

The planet carrier 33 is provided with a gear 42, which receives motion from auxiliary driver 43. In the embodiment of FIG. 4 the auxiliary driver 43 is mechanically coupled to the gear 42 via a pinion 45 that is keyed on a driving shaft 47 of the auxiliary driver 43.

Similarly to FIG. 3, also in FIG. 4 the auxiliary driver 43 is an electric motor powered by the electric power distribution grid 9. The rotational speed variation of the auxiliary driver 43 is again obtained through a variable frequency driver (VFD) 49 arranged between the electric power distribution grid 9 and the electric motor 43.

In the embodiment of FIG. 4 the main driver 3 thus transmits the main power to the load 5 through the variable speed transmission 11, the transmission ratio whereof is modulated by acting upon the planet carrier 33, rather than on the ring gear 31 as shown in the embodiment of FIG. 3.

In both embodiments the rotational speed of the load 5 is controlled by controller 12, which provides a signal to the variable speed transmission 11 to modify the rotational speed of the load 5 by acting upon the auxiliary driver 43.

Figure 5:
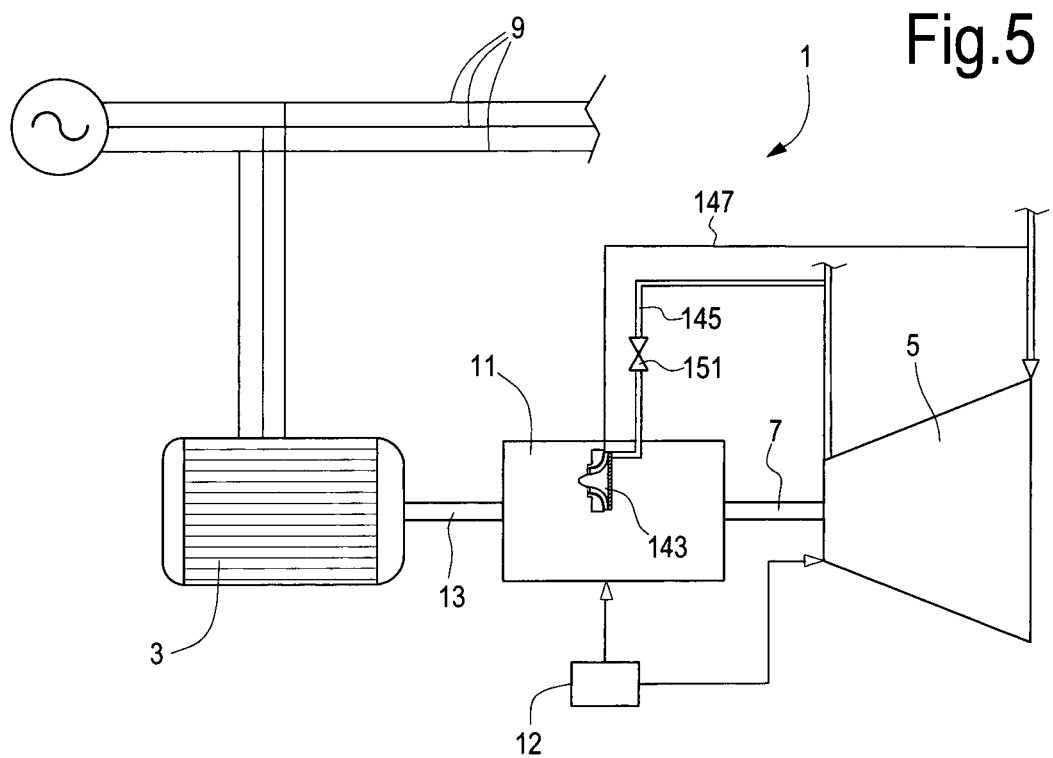
FIG. 5 schematically illustrates a further embodiment of a system according to the present disclosure.

FIG. 5 illustrates a schematic of a further embodiment of a system according to the present disclosure. The system is again labeled 1 as a whole and comprises a main driver 3 and a load 5. The main driver 3 can be a fixed-speed driver, such as an electric motor. The load is here shown as a single compressor 5, e.g. a centrifugal compressor, an axial compressor, or a reciprocating compressor. A variable speed transmission 11 is arranged between the driver and the load 5 and is drivingly coupled to the main driver 3 via shaft 13 and to the load 5 via shaft 7. A controller 12 is provided, which is configured for controlling the rotational speed of the load 5 via the variable speed transmission 11.

Figure 6:
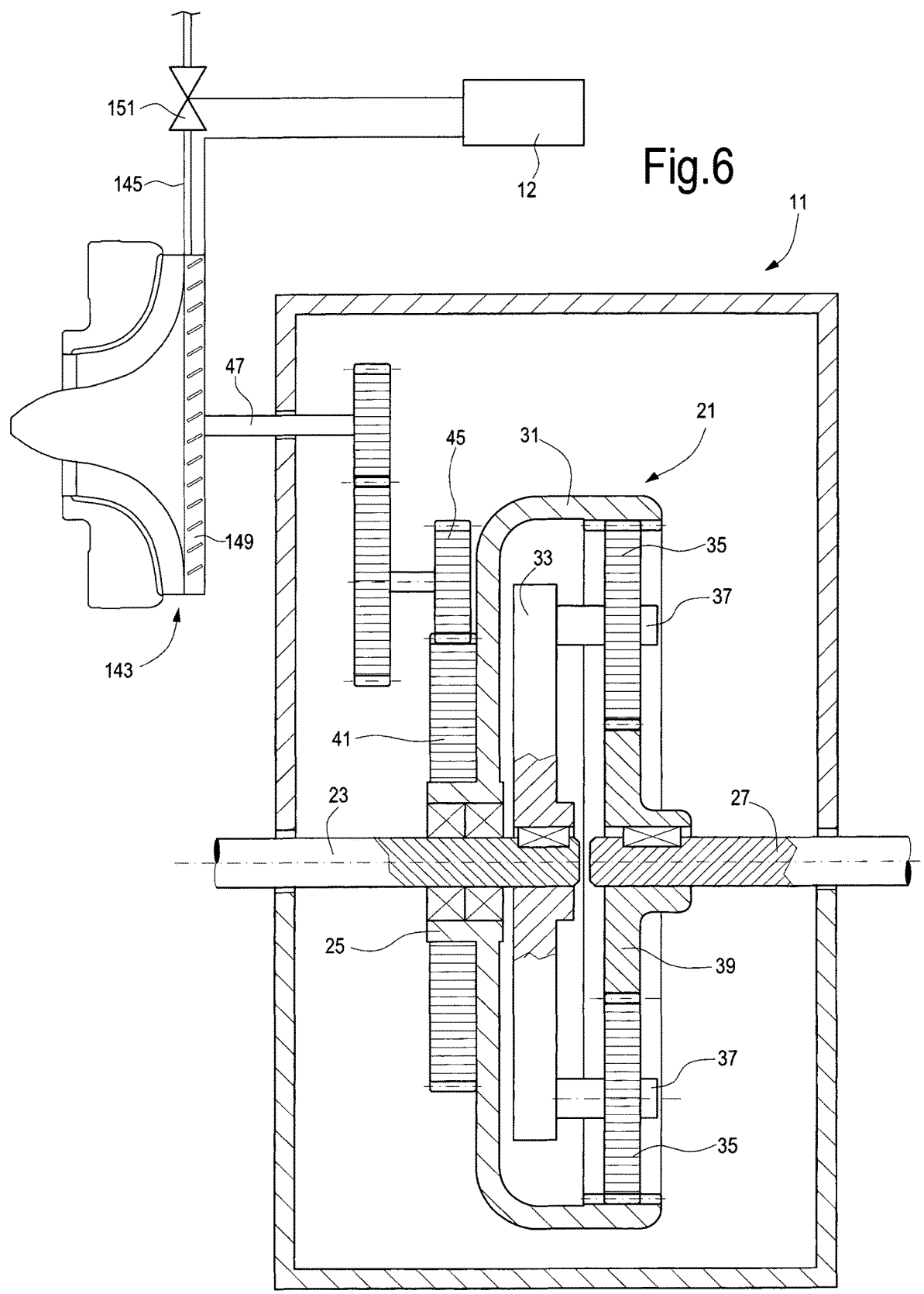
FIGS. 6 and 7 illustrate sectional views of a variable speed transmission of the system of FIG. 5.

Referring now to FIG. 6, with continuing reference to FIG. 5, a possible embodiment of the variable speed transmission 11 for the system of FIG. 5 is described. The variable speed transmission 11 comprises a speed summing gear arrangement 21 comprised of a first input shaft 23, a second input shaft 25 and an output shaft 27. The output shaft 27 is mechanically coupled to shaft 7 or may form part thereof. The input shaft 23 is mechanically coupled to shaft 13 or may form part thereof.

In the embodiment of FIG. 6 the speed summing gear arrangement 21 is an epicyclic gear train configured in substantially the same way as in FIG. 3. The epicyclic gear train 21 comprises a ring gear 31 and a planet carrier 33, which supports a plurality of planet gears 35. Each planet gear 35 is idly mounted on a pin 37 constrained to the planet carrier 33 and rotating therewith. The epicyclic gear train 21 further comprises a sun gear 39 keyed on the output shaft 27 and rotating therewith. In the embodiment of FIG. 6 the ring gear 31 is an internal gear and the planet gears 35 mesh with the internal ring gear 31 and with the sun gear 39. The planet carrier 33 is keyed on the first input shaft 23 and rotates therewith.

The ring gear 31 rotates integrally with a gear 41, which receives motion from an auxiliary driver 143. In the embodiment of FIG. 6 the auxiliary driver 143 is mechanically coupled to gear 41 via a pinion 45 that is keyed on a driving shaft 47 of the auxiliary driver 43.

In the embodiment of FIG. 6 the auxiliary driver 143 is a turboexpander, for instance a centripetal turboexpander, which can be provided with variable inlet guide vanes 149. The turboexpander 143 can be powered by a compressed process gas, delivered e.g. through an inlet duct 145 (FIG. 5). The compressed process gas expands in the turboexpander 143 and is discharged through a delivery duct 147 (FIG. 5). The enthalpy drop of the process gas across the turboexpander 143 in converted into mechanical power to drive the ring gear 31. The amount of mechanical power generated by the turboexpander 143 and thus the rotational speed of the ring gear 31, and ultimately the transmission ratio of the variable speed transmission 11, can be adjusted via the variable inlet guide vanes 149 and/or via a gas pressure valve 151. The controller 12 can be functionally connected to said components for modulating the transmission ratio of the variable speed transmission 11 and adapt the rotational speed of the output shaft 27 to the required rotational speed of the load 5 acting upon both the variable inlet guide vanes 149 and on the gas pressure valve 151, or upon only one of said components.

In some embodiments, as schematically shown in FIG. 5, the gas which is expanded through the turboexpander 143 is provided by compressor 5, i.e. a fraction of the gas processed through the compressor 5 is used to provide mechanical power via the turboexpander 143. The turboexpander can be provided with a brake to lock the shaft thereof at start-up of the system, if so required. This can particularly be the case when the gas which is expanded through the turboexpander 143 is the same gas processed through compressor 5.

In other embodiments, a different source of a pressurized fluid can be provided to power the turboexpander. In yet further embodiments, another turbomachine can be used, e.g. a pump, when a pressurized liquid is available as a power source.

Figure 7:
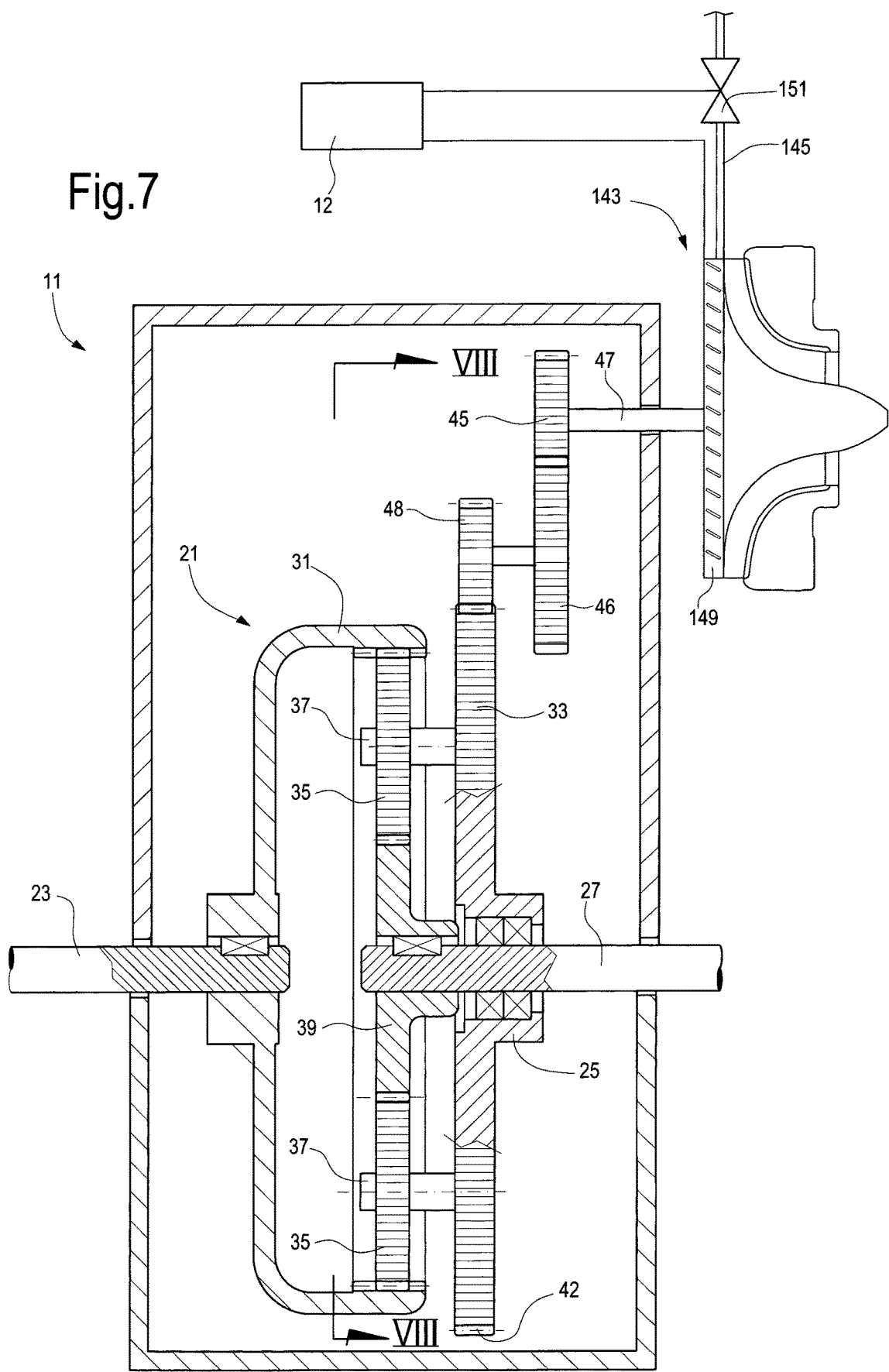

Referring to FIG. 7, with continuing reference to FIGS. 5 and 6, a further embodiment of the variable speed transmission 11 is shown. The difference between the embodiments of FIGS. 6 and 7 mainly concerns the different arrangement of the gears in the epicyclic gear train 21. The epicyclic gear train 21 of FIG. 7 again comprises a ring gear 31 and a planet carrier 33, which supports a plurality of planet gears 35. Each planet gear 35 is idly mounted on a respective pin 37 constrained to the planet carrier 33 and rotating therewith. The epicyclic gear train 21 further comprises a sun gear 39 keyed on the output shaft 27 and rotating therewith. In the embodiment of FIG. 7 the ring gear is again an internal gear and the planet gears 35 are in mesh with the internal ring gear 31. The planet gears 35 are further in mesh with the sun gear 39. Differently from the embodiment of FIG. 6, in FIG. 7 the ring gear 31 is keyed on the first input shaft 23 and rotates therewith.

The planet carrier 33 is provided with a gear 42, which rotates integrally therewith. The gear 42 receives motion from auxiliary driver 143. In the embodiment of FIG. 7 the auxiliary driver 143 is mechanically coupled to gear 42 via a pinion 45 that is keyed on a driving shaft 47 of the auxiliary driver 143. By way of example, a further gear train 46, 48 is arranged between pinion 45 and gear 42.

Figure 8:
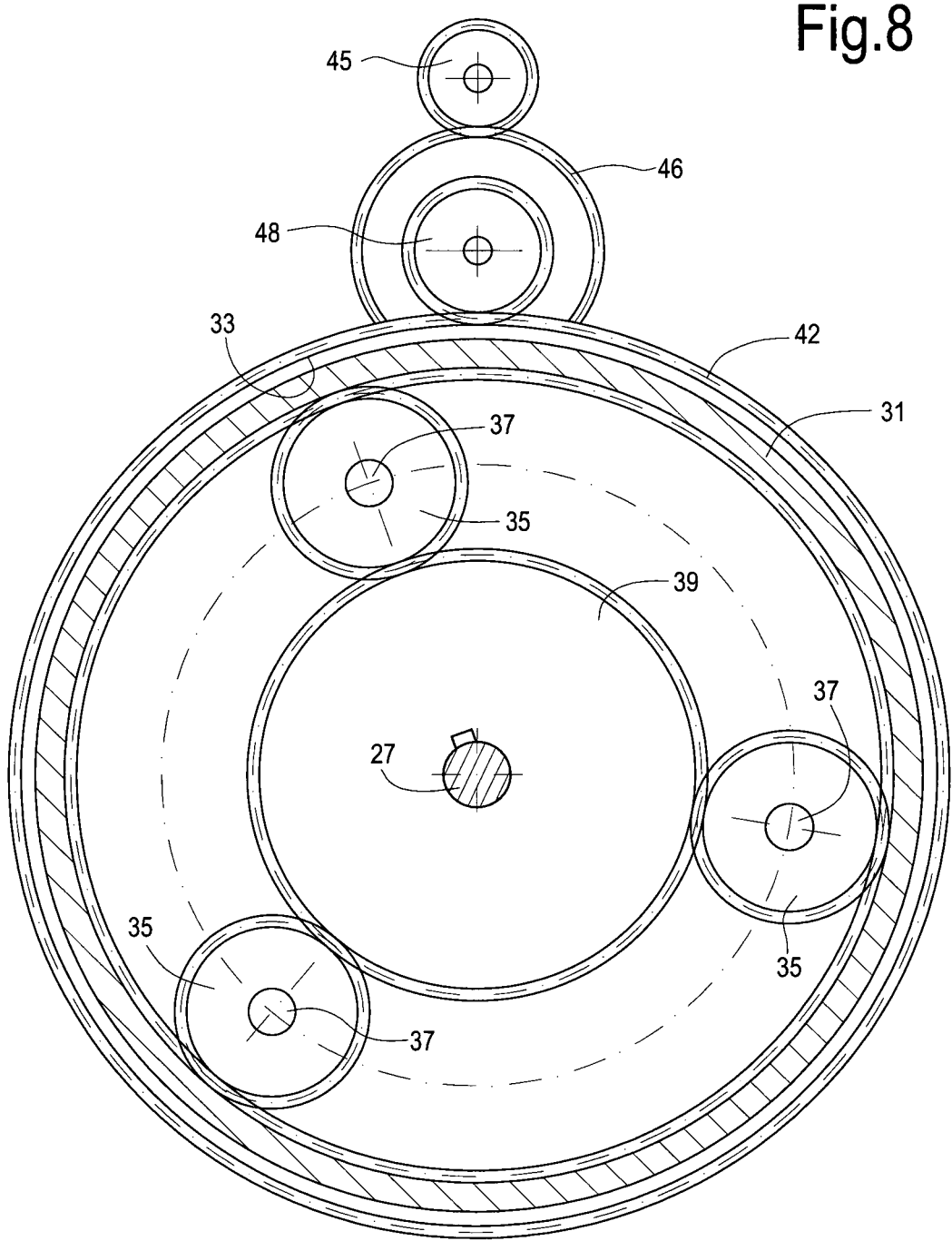
FIG. 8 illustrates a sectional view according to line VIII-VIII of FIG. 7.

FIG. 8 illustrates a cross-sectional view along line VIII-VIII showing the main components of the epicyclic gear train 21 of FIG. 7.

The operation of the variable speed transmission 11 of FIG. 7 is substantially the same as described above in connection with FIG. 6.

Figure 9:
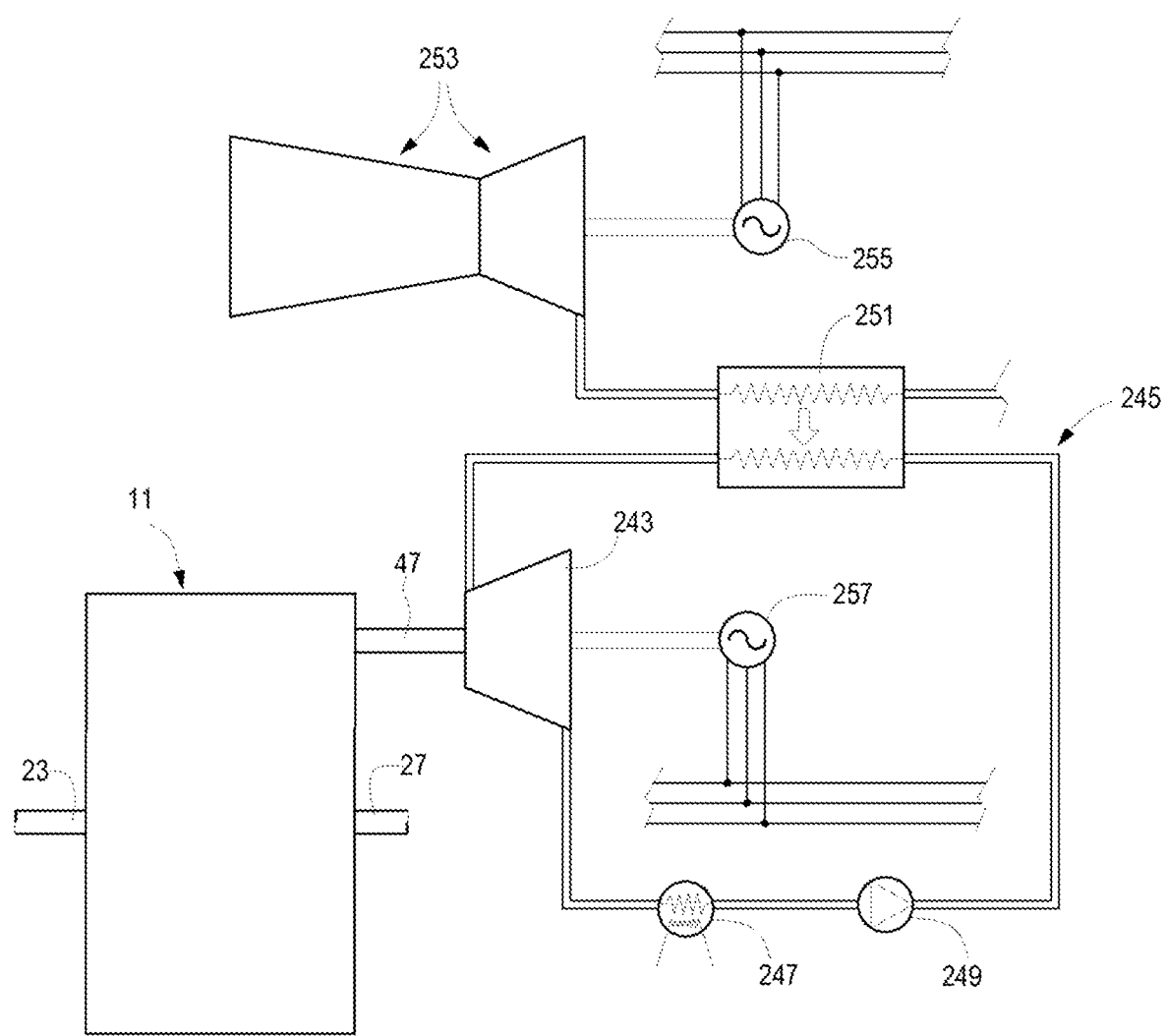
FIG. 9 illustrates a schematic of a combined gas turbine/OCR cycle comprising an expander coupled to a variable speed transmission unit according to the present disclosure.

FIG. 9 illustrates a yet further embodiment according to the present disclosure. The same reference numbers designate the same or corresponding elements as already disclosed in connection with the preceding figures. In the embodiment of FIG. 9 the variable speed transmission 11 is coupled to an auxiliary driver in the form of a turbomachine 243, for instance an ORC (Organic Rankine Cycle). Reference numbers 23 and 27 again designate the input shaft and the output shaft of the variable speed transmission 11. The inner components of the variable speed transmission 11 are not shown in FIG. 9 and can be designed according to any one of the embodiments disclosed herein.

The ORC turbine 243 is arranged in a closed circuit 245 of an organic Rankine cycle, for instance. In other embodiments, the closed circuit 245 can be a Rankine cycle and the turbine 243 can be a steam turbine.

The circuit 245 can be designed in any manner known to those skilled in the art. In summary, the circuit 245 can comprise a condenser or cooler 247, a pump 249 and a heat exchanger 251. A working fluid circulates in the closed circuit and is subjected to cyclic thermodynamic transformations, to convert heat from the heat exchanger 251 into useful mechanical power available on the output shaft of the turbine or turboexpander 243.

The hot side of the heat exchanger 251 can receive heat from the gas exhaust stack of a gas turbine engine 253, from a gas reciprocating motor or from any other source of waste heat, i.e. wherefrom heat at relatively low temperature is available. The gas turbine engine 253 can form part of a gas generator arrangement, and can be used to drive an electric generator 255. In other embodiments, the gas turbine engine 253 can be used for mechanical drive applications, e.g. to drive a compressor or a compressor train, a pump, or any combination of rotating loads.

Waste heat is recovered from the exhaust combustion gas in the heat exchanger 251 and is used to vaporize and heat an organic fluid, e.g. cyclopentane or any other suitable OCR fluid. The hot and pressurized fluid is then expanded in the turboexpander or turbine 245, cooled and possibly condensed in condenser 247 and pumped by pump 249 to the heat exchanger 251 again.

Expansion of the fluid in the turboexpander or turbine 245 generates mechanical power. The power can be used as input mechanical power through a driving shaft 47 which mechanically connects the turboexpander or turbine 245 to the variable speed transmission 11. If additional mechanical power is available on the shaft of the turboexpander or turbine 245, e.g. because no or little power is required by the variable speed transmission 11, or because the waste heat available from the heat exchanger 251 exceeds the power rate required by the variable speed transmission 11, at least a part of the mechanical power available on the output shaft of the turboexpander or turbine 245 can be converted into electric power by an auxiliary electric generator 257.

The arrangement of FIG. 9 can result in improved overall energy efficiency of a combined cycle, where waste heat from a top-temperature cycle (gas turbine engine 253) is exploited to generate useful electric and/or mechanical power, at least a portion whereof can be used as an auxiliary input power for the variable speed transmission 11. Additional, high quality electric power to drive the auxiliary input shaft of the variable speed transmission 11 is not required.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims.

For instance, in the above described embodiments the speed summing gear arrangement is formed by a simple epicyclic gear train, wherein each planet gear is in mesh with both the ring gear and the sun gear. In other embodiments, a complex epicyclic gear train can be envisaged. In this class of epicyclic gear trains, the planet gears are each in mesh with either only the ring gear or only the sun gear. The planet carrier in this case supports pairs of planet gears.

Additionally, while in the disclosed embodiments the ring gear is an internal gear, i.e. a hollow ring with internally arranged teeth, in other embodiments the ring gear can be an external gear, quite in the same way as the sun gear. Indeed, in some cases the ring and sun gears are cumulatively named sun gears.

Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A system comprising:
   a main driver configured for rotating at a substantially constant rotational speed;
   a rotating load configured to be driven into rotation by the main driver;
   a controller, for controllably adjusting a load rotational speed;
   a variable speed transmission arranged between the main driver and the load and comprising a speed summing gear arrangement having a first input shaft drivingly coupled to the main driver, a second input shaft, and an output shaft drivingly coupled to the rotating load; and
   an auxiliary driver comprising a gas turbine or a turboexpander mechanically coupled to the second input shaft of the speed summing gear arrangement and configured rotate the second input shaft,
   wherein the speed of the output shaft is a combination of a speed of the main driver and a speed of the auxiliary driver.

2. The system of claim 1, wherein the speed summing gear arrangement comprises an epicyclic gear train.

3. The system of claim 2, wherein the epicyclic gear train comprises a sun gear, a ring gear, at least one planet gear supported on a planet carrier.

4. The system of claim 3, wherein the auxiliary driver is drivingly coupled to one of the ring gear and the planet carrier.

5. The system of claim 3, wherein the main driver is drivingly coupled to one of the ring gear to the planet carrier.

6. The system of claim 3, wherein the output shaft is drivingly coupled to the sun gear.

7. A system comprising:
   a main driver configured for rotating at a substantially constant rotational speed;
   a rotating load configured to be driven into rotation by the main driver;
   a controller, for controllably adjusting a load rotational speed;
   a variable speed transmission arranged between the main driver and the load and comprising a speed summing gear arrangement having a first input shaft drivingly coupled to the main driver, a second input shaft, and an output shaft drivingly coupled to the rotating load; and
   an auxiliary driver mechanically coupled to the second input shaft of the speed summing gear arrangement and configured rotate the second input shaft, the auxiliary driver comprising at least one adjustment device functionally coupled to the controller for adjusting a gas flowrate through the auxiliary driver,
   wherein the speed of the output shaft is a combination of a speed of the main driver and a speed of the auxiliary driver.

8. The system of claim 7, wherein the adjustment device comprises at least one of a gas pressure valve and variable inlet guide vanes.

9. A system comprising:
   a main driver configured for rotating at a substantially constant rotational speed;
   a rotating load configured to be driven into rotation by the main driver;
   a controller, for controllably adjusting a load rotational speed;
   a variable speed transmission arranged between the main driver and the load and comprising a speed summing gear arrangement having a first input shaft drivingly coupled to the main driver, a second input shaft, and an output shaft drivingly coupled to the rotating load; and
   an auxiliary driver arranged in a closed thermodynamic circuit and mechanically coupled to the second input shaft of the speed summing gear arrangement and configured rotate the second input shaft, wherein the speed of the output shaft is a combination of a speed of the main driver and a speed of the auxiliary driver.

10. A method for operating a variable-speed rotating load, comprising the following steps:
   driving the rotating load with a constant-speed main driver through a speed summing gear arrangement comprised of a first input shaft, a second input shaft and an output shaft, the first input shaft being drivingly coupled to the main driver; and
   varying the speed of the rotating load by supplying auxiliary power to the second input shaft by an auxiliary driver comprising a turboexpander, and controlling a rotational speed of the load by adjusting the speed of the auxiliary driver,
   wherein the load comprises a compressor, and compressed gas from the compressor is processed through the turboexpander to generate mechanical power.

11. A method for operating a variable-speed rotating load, comprising the following steps:
   driving the rotating load with a constant-speed main driver through a variable speed transmission comprising a speed summing gear arrangement comprised of a first input shaft, a second input shaft and an output shaft, the first input shaft being drivingly coupled to the main driver;
   varying the speed of the rotating load by supplying auxiliary power to the second input shaft by an auxiliary driver, and controlling a rotational speed of the load by adjusting the speed of the auxiliary driver;
   circulating a working fluid in a closed circuit;
   delivering heat to the circulating working fluid;
   subjecting the circulating working fluid to cyclic thermodynamic transformations, including an expansion in the auxiliary driver, to partly convert the heat into mechanical power; and
   deliver at least part of the mechanical power into the variable speed transmission.

\* \* \* \* \*